US012010685B2

(12) United States Patent
Yang et al.

(10) Patent No.: US 12,010,685 B2
(45) Date of Patent: Jun. 11, 2024

(54) INFORMATION TRANSMISSION METHOD FOR SIDELINK, AND USER EQUIPMENT AND COMPUTER-READABLE STORAGE MEDIUM

(71) Applicant: SPREADTRUM SEMICONDUCTOR (NANJING) CO., LTD., Jiangsu (CN)

(72) Inventors: Yi Yang, Shanghai (CN); Yang Zhang, Shanghai (CN); Wei Yan, Shanghai (CN); Xin Qu, Shanghai (CN)

(73) Assignee: SPREADTRUM SEMICONDUCTOR (NANJING) CO., LTD., Jiangsu (CN)

( * ) Notice: Subject to any disclaimer, the term of this patent is extended or adjusted under 35 U.S.C. 154(b) by 410 days.

(21) Appl. No.: 17/419,570

(22) PCT Filed: Dec. 25, 2019

(86) PCT No.: PCT/CN2019/128241
§ 371 (c)(1),
(2) Date: Jun. 29, 2021

(87) PCT Pub. No.: WO2020/135486
PCT Pub. Date: Jul. 2, 2020

(65) Prior Publication Data
US 2022/0070846 A1    Mar. 3, 2022

(30) Foreign Application Priority Data

Dec. 29, 2018    (CN) .......................... 201811636465.0

(51) Int. Cl.
*H04W 72/20*    (2023.01)
*H04L 27/26*    (2006.01)
*H04W 72/044*    (2023.01)

(52) U.S. Cl.
CPC ......... *H04W 72/20* (2023.01); *H04L 27/2605* (2013.01); *H04W 72/044* (2013.01)

(58) Field of Classification Search
CPC ..... H04W 72/20; H04W 72/21; H04W 72/23; H04W 72/25; H04W 72/40; H04W 72/50;
(Continued)

(56) References Cited

U.S. PATENT DOCUMENTS

2016/0128094 A1*  5/2016  Lee .................. H04W 72/21
                                                370/329
2017/0290028 A1* 10/2017  Lee .................. H04W 72/12
(Continued)

FOREIGN PATENT DOCUMENTS

CN    106793092 A    5/2017
CN    107370561 A    11/2017
(Continued)

OTHER PUBLICATIONS

Li et al., "Joint autonomous resource selection and scheduled resource allocation for D2D-based V2X communication", Institute of Electrical and Electronics Engineers (IEEE), vol. Jun. 2018; pp. 1-5.
(Continued)

*Primary Examiner* — Kevin D Mew
(74) *Attorney, Agent, or Firm* — CANTOR COLBURN LLP

(57) ABSTRACT

Disclosed are an information transmission method for a sidelink, and a user equipment and a computer-readable storage medium. The method comprises: detecting a control channel indication sequence at a pre-set position of each time slot; and based on the detected control channel indication sequence, determining, in the time slot where the sequence is located, a time-frequency resource position where a corresponding physical sidelink control channel is located, wherein the control channel indication sequences correspond to the physical sidelink control channels on a one-to-one basis. By applying the solution, an actual time-
(Continued)

frequency resource position of a PSCCH can be indicated to a UE in a sidelink of an NR system.

19 Claims, 8 Drawing Sheets

(58) Field of Classification Search
CPC . H04W 72/56; H04W 72/563; H04W 72/044; H04L 27/2602; H04L 27/2605
See application file for complete search history.

(56) References Cited

U.S. PATENT DOCUMENTS

| 2019/0044667 | A1* | 2/2019 | Guo | H04L 1/1822 |
| 2019/0342910 | A1* | 11/2019 | Cao | H04L 5/0091 |
| 2020/0022181 | A1 | 1/2020 | Li et al. | |
| 2020/0029340 | A1* | 1/2020 | He | H04W 76/14 |
| 2020/0092685 | A1* | 3/2020 | Fehrenbach | H04W 84/047 |
| 2020/0106566 | A1* | 4/2020 | Yeo | H04W 28/04 |
| 2020/0146044 | A1* | 5/2020 | Maaref | H04W 92/18 |
| 2021/0037468 | A1* | 2/2021 | Huang | H04W 76/23 |
| 2021/0045074 | A1* | 2/2021 | Manolakos | H04L 5/0057 |
| 2021/0051500 | A1* | 2/2021 | Chae | H04L 5/0048 |
| 2021/0058866 | A1* | 2/2021 | Hosseini | H04W 52/0229 |
| 2022/0232547 | A1* | 7/2022 | Wang | H04W 72/20 |
| 2023/0275715 | A1* | 8/2023 | Paz | H04L 5/0094 370/329 |

FOREIGN PATENT DOCUMENTS

| CN | 107734557 A | 2/2018 |
| CN | 108668371 A | 10/2018 |
| CN | 108809603 A | 11/2018 |
| WO | 2016184236 A1 | 11/2016 |
| WO | 2017026975 A1 | 2/2017 |

OTHER PUBLICATIONS

International Search Report for International Application No. PCT/CN2019/128241; dated Mar. 16, 2020.

* cited by examiner

INFORMATION TRANSMISSION METHOD FOR SIDELINK, AND USER EQUIPMENT AND COMPUTER-READABLE STORAGE MEDIUM

CROSS-REFERENCE TO RELATED APPLICATIONS

This is the U.S. national stage of application No. PCT/CN2019/128241, filed on Dec. 25, 2019. Priority under 35 U.S.C. § 119(a) and 35 U.S.C. § 365(b) is claimed from Chinese Application No. 201811636465.0, filed Dec. 29, 2018, the disclosure of which is also incorporated herein by reference.

TECHNICAL FIELD

The present disclosure generally relates to communication technology field, and more particularly, to an information transmission method for a sidelink, and a user equipment, and a computer-readable storage medium.

BACKGROUND

In a wireless communication system, a uu link is a wireless communication protocol between a User Equipment (UE) and a base station (for example, a UTRAN). Compared with the uu link, a sidelink is a wireless communication protocol between a UE and another UE, which does not have the participation of the base station. In this case, the UE and the another UE transmit data through a PC5 interface.

In a New Radio (NR) system of the fifth-generation mobile communication (5G), a Physical Sidelink Control Channel (PSCCH) and a Physical Sidelink Shared Channel (PSSCH) may be multiplexed in a way shown in FIG. 1, that is, a part of a PSCCH and a part of an associated PSSCH may use overlapping time domain resources but non-overlapping frequency domain resources for transmission, but another part of the associated PSSCH and/or another part of the PSCCH may use non-overlapping time domain resources for transmission.

In a uu link of the NR system, the base station sends a downlink control information to the UE through a Radio Resource Control (RRC) signaling, so that the UE can blindly detect an actual time-frequency resource position of a physical downlink control channel. However, in a sidelink of the NR system, since the base station does not participate in the transmission between the UE and the another UE, the method for indicating the actual time-frequency resource position used in the uu link cannot be used to indicate an actual time-frequency resource position of the PSCCH to the UE.

Therefore, how to indicate the actual time-frequency resource position of the PSCCH to the UE in the sidelink of the NR system is a problem to be solved.

SUMMARY

Embodiments of the present disclosure provide a solution for how to indicate an actual time-frequency resource position of a PSCCH to a UE in a sidelink of a NR system.

In an embodiment of the present disclosure, an information transmission method for a sidelink is provided, including: detecting control channel indication sequences at a pre-set position of each time slot; and according to the control channel indication sequences, determining time-frequency resource positions of Physical Sidelink Control Channels (PSCCHs) corresponding to the control channel indication sequences in the time slot; and wherein the control channel indication sequences has a one-to-one corresponding relationship with the PSCCHs.

Optionally, detecting control channel indication sequences at a pre-set position of each time slot includes: detecting the control channel indication sequences on a pre-set symbol of each time slot.

Optionally, the preset symbol includes one of: a first symbol of the time slot; a previous symbol of the PSCCHs in the time slot; and a first symbol of the time slot which is a previous symbol of the PSCCHs.

Optionally, a frequency domain length of the control channel indication sequences is less than or equal to a minimum length of a minimum frequency domain unit configured for Physical Sidelink Shared Channels (PSSCHs) associated with the PSCCHs.

Optionally, the frequency domain length of the control channel indication sequences is p minimum frequency domain units, where p is a positive integer; and frequency domain resource positions where the control channel indication sequences are located, are first p minimum frequency domain units or last p minimum frequency domain units of the PSSCHs associated with the PSCCHs.

Optionally, a start position of the frequency domain resources where the control channel indication sequences are located is in a middle minimum frequency domain unit of the PSSCHs associated with the PSCCHs.

Optionally, detecting the control channel indication sequences on a pre-set symbol of each time slot includes: at the pre-set position of each time slot, determining the control channel indication sequences transmitted on different resource blocks according to a preset frequency comb parameter; and determining the control channel indication sequences multiplexed on a same resource block according to a pre-set cyclic shift parameter or a pre-set orthogonal cover code parameter.

Optionally, when the pre-set symbol is a previous symbol of the PSCCHs, the PSCCHs corresponding to the control channel indication sequences are located on any symbol of the time slot and within a frequency domain range of the control channel indication sequences.

Optionally, according to the control channel indication sequences, determining time-frequency resource positions of PSCCHs corresponding to the control channel indication sequences in the time slot includes: according to the control channel indication sequences, determining a time-frequency resource range of the PSCCHs in the time slot; and within the time-frequency resource range, performing blind detection according to a preset detection parameter to determine the time-frequency resource positions of the PSCCHs corresponding to the control channel indication sequences in the time slot.

Optionally, the information transmission method for a sidelink further includes: detecting a sidelink control information at the time-frequency resource positions of the PSCCHs corresponding to the control channel indication sequences; and according to the sidelink control information, determining a time-frequency resource position of an actually used Physical Sidelink Feedback Channel (PSFCH) in PSFCHs corresponding to the time-frequency resource positions of the PSCCHs.

Optionally, according to the sidelink control information, determining a time-frequency resource position of an actually used Physical Sidelink Feedback Channel (PSFCH) among PSFCHs corresponding to the time-frequency resource positions of the PSCCHs includes: according to a time-domain offset information in the sidelink control information and an identification information of the actually used PSFCH, determining the time-frequency resource position of the actually used PSFCH among the PSFCHs corresponding to the time-frequency resource positions of the PSCCHs; and the PSFCHs corresponding to the time-frequency resource positions of the PSCCHs use independent time-frequency resource positions within the time-frequency resource range of the PSSCHs associated with the PSCCHs.

Optionally, according to the sidelink control information, determining a time-frequency resource position of an actually used Physical Sidelink Feedback Channel (PSFCH) among PSFCHs corresponding to the time-frequency resource positions of the PSCCHs includes: according to a frequency domain offset information, a time domain offset information and an identification information of the actually used PSFCH, determining the time-frequency resource position of the actually used PSFCH among the PSFCHs corresponding to the time-frequency resource positions of the PSCCHs; and wherein the PSFCHs corresponding to the time-frequency resource positions of the PSCCHs share time-frequency resource positions within the time-frequency resource range of the PSSCHs associated with the PSCCHs.

Optionally, the information transmission method for a sidelink further includes: when a Sidelink Feedback Control Information (SFCI) and a transmission data need to be sent at the same time, determining an order of sending the SFCI and the transmission data according to pre-configured transmission priorities.

Optionally, the transmission priorities is configured based on at least one of following factors: a number of carriers which are able to be simultaneously transmitted by a sending User Equipment (UE) and a receiving UE; a related configuration of a carrier combination of the sending UE and the receiving UE; and a callback time of radio frequency receiving and sending of the sending UE and the receiving UE.

In an embodiment of the present disclosure, a User Equipment (UE) is provided, including: a first detection unit, adapted to detect control channel indication sequences at a pre-set position of each time slot; and a first determination unit, adapted to, according to the control channel indication sequences, determine time-frequency resource positions of PSCCHs corresponding to the control channel indication sequences in the time slot; and wherein the control channel indication sequences has a one-to-one corresponding relationship with the PSCCHs.

Optionally, the first detection unit is adapted to detect the control channel indication sequences on a pre-set symbol of each time slot.

Optionally, the pre-set symbol includes one of: a first symbol of the time slot; a previous symbol of the PSCCHs in the time slot; and a first symbol of the time slot which is a previous symbol of the PSCCHs.

Optionally, a frequency domain length of the control channel indication sequences detected by the first detection unit is less than or equal to a minimum length of a minimum frequency domain unit configured for Physical Sidelink Shared Channels (PSSCHs) associated with the PSCCHs.

Optionally, the frequency domain length of the control channel indication sequences detected by the first detection unit is p minimum frequency domain units, where p is a positive integer; and frequency domain resource positions where the control channel indication sequences are located, are first p minimum frequency domain units or last p minimum frequency domain units of the PSSCHs associated with the PSCCHs.

Optionally, a start position of the frequency domain resources where the control channel indication sequences detected by the first detection unit are located is in a middle minimum frequency domain unit of the PSSCHs associated with the PSCCHs.

Optionally, the first detection unit is adapted to, at the pre-set position of each time slot, determine the control channel indication sequences transmitted on different resource blocks according to a pre-set frequency comb parameter, and determine the control channel indication sequences multiplexed on a same resource block according to a pre-set cyclic shift parameter or a pre-set orthogonal cover code parameter.

Optionally, when the pre-set symbol is a previous symbol of the PSCCHs, the PSCCHs corresponding to the control channel indication sequences are located on any symbol of the time slot and within a frequency domain range of the control channel indication sequences.

Optionally, the first determination unit is adapted to, according to the control channel indication sequences, determine a time-frequency resource range of the PSCCHs in the time slot; and within the time-frequency resource range, perform blind detection according to a pre-set detection parameter to determine the time-frequency resource positions of the PSCCHs corresponding to the control channel indication sequences in the time slot.

Optionally, the UE further includes: a second detection unit, adapted to detect a sidelink control information at the time-frequency resource positions of the PSCCHs corresponding to the control channel indication sequences; and a second determination unit, adapted to, according to the sidelink control information, determine a time-frequency resource position of an actually used Physical Sidelink Feedback Channel (PSFCH) in PSFCHs corresponding to the time-frequency resource positions of the PSCCHs.

Optionally, the second determination unit is adapted to, according to a time-domain offset information in the sidelink control information and an identification information of the actually used PSFCH, determine the time-frequency resource position of the actually used PSFCH among the PSFCHs corresponding to the time-frequency resource positions of the PSCCHs; and wherein the PSFCHs corresponding to the time-frequency resource positions of the PSCCHs use independent time-frequency resource positions within the time-frequency resource range of the PSSCHs associated with the PSCCHs.

Optionally, the second determination unit is adapted to, according to a frequency domain offset information, a time domain offset information and an identification information of the actually used PSFCH, determine the time-frequency resource position of the actually used PSFCH among the PSFCHs corresponding to the time-frequency resource positions of the PSCCHs; and wherein the PSFCHs corresponding to the time-frequency resource positions of the PSCCHs share time-frequency resource positions within the time-frequency resource range of the PSSCHs associated with the PSCCHs.

Optionally, the UE further includes: a transmission control unit, adapted to, when a Sidelink Feedback Control Information (SFCI) and a transmission data need to be sent at the same time, determine an order of sending the SFCI and the transmission data according to pre-configured transmission priorities.

Optionally, the transmission priorities are configured based on at least one of following factors: a number of carriers which are able to be simultaneously transmitted by a sending User Equipment (UE) and a receiving UE; a related configuration of a carrier combination of the sending UE and the receiving UE; and a callback time of radio frequency receiving and sending of the sending UE and the receiving UE.

In an embodiment of the present disclosure, a computer-readable storage medium having computer instructions stored therein is provided, wherein once the computer instructions are executed, the above method is performed.

In an embodiment of the present disclosure, a user equipment including a memory and a processor is provided, wherein the memory has computer instructions stored therein, and when the processor executes the computer instructions, the above method is performed.

Embodiments of the present disclosure may provide following advantages.

In embodiments of the present disclosure, by indicating positions of PSCCHs with control channel indication sequences, a UE can detect the positions of the PSCCHs more quickly, thereby improving sidelink information transmission efficiency. Further, the control channel indication sequences are configured at a pre-set position of each time slot, and the positions of the corresponding PSCCHs can be determined based on the control channel indication sequences, so that the UE can configure the PSCCHs more flexibly. In addition, since the control channel indication sequences has a one-to-one corresponding relationship with the PSCCHs, by setting different control channel indication sequences for PSCCHs with different functions, the UE can support multiple PSCCHs with different functions.

DETAILED DESCRIPTION

As described in background, how to indicate an actual time-frequency resource position of a PSCCH to a UE in a sidelink of a NR system is a problem to be solved.

In embodiments of the present disclosure, an information transmission method for a sidelink is provided. According to the embodiments, control channel indication sequences are detected at a pre-set position of each time slot; and according to the control channel indication sequences, time-frequency resource positions of corresponding PSCCHs are determined in the time slot. By using the control channel indication sequences to indicate the time-frequency resource positions of the corresponding PSCCHs, a UE can detect the time-frequency resource positions of the PSCCHs more quickly. Moreover, since control channel indication sequences are configured at the pre-set position of each time slot, and the time-frequency resource positions of the corresponding PSCCHs can be determined based on the control channel indication sequences, the UE is enabled to configure PSCCHs more flexibly. In addition, since the control channel indication sequences has a one-to-one corresponding relationship with the PSCCHs, the UE is enabled to support multiple PSCCHs with different functions by setting different control channel indication sequences for the multiple PSCCHs with different functions.

In order to clarify the object, characteristic and advantages of embodiments of the present disclosure, embodiments of present disclosure will be described clearly in detail in conjunction with accompanying drawings.

Figure 1:
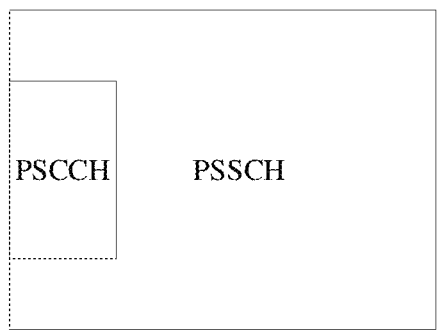
FIG. 1 schematically illustrates a PSCCH and a PSSCH be multiplexed in time-frequency resources in the prior art.
Figure 2:
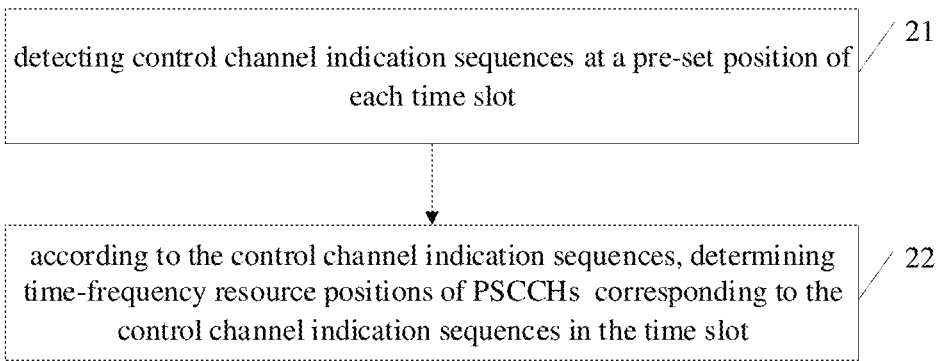
FIG. 2 schematically illustrates a flow chart of an information transmission method for a sidelink according to an embodiment.

In an embodiment of the present disclosure, an information transmission method for a sidelink is provided. Referring to FIG. 2, the method includes S21 and S22.

In S21, control channel indication sequences are detected at a pre-set position of each time slot, where the control channel indication sequences has a one-to-one corresponding relationship with PSCCHs.

In some embodiments, an upper layer may configure the PSCCHs in each time slot in advance, and configure the one-to-one corresponding relationship between the PSCCHs and the control channel indication sequences. According to the configuration of the higher layer, a sending UE may use the control channel indication sequences to indicate time-frequency resource positions of the PSCCHs to a receiving UE.

In some embodiments, there may be only one PSCCH or multiple PSCCHs configured in each time slot, and a number of the PSCCHs is not limited in the embodiments. However, regardless of the number of the PSCCHs, the control channel indication sequences which have the one-to-one corresponding relationship with the PSCCHs may be used to indicate.

In some embodiments, forms of the control channel indication sequences are not limited. For example, the control channel indication sequences may be set to be Pseudo-random sequences or Low-PAPR sequences.

In some embodiments, a position of the control channel indication sequences in each time slot which is the pre-set position, may include a time domain position and a frequency domain position. A time-frequency resource position of a PSCCH corresponding to each control channel indication sequence may include a time-domain position and a frequency-domain position. Those skilled in the art can understand that the time domain positions and the frequency domain positions are not limited, and may be pre-configured by the higher layer.

In some embodiments, the control channel indication sequences corresponding to different PSCCHs may have a same length or different lengths. In each time slot, the time-frequency resource positions of PSSCHs occupied by the control channel indication sequences may be the same or different.

Optionally, in order to facilitate detection of the control channel indication sequences and reduce detection complexity, the lengths of the control channel indication sequences may be configured, and the time-frequency resource positions of the PSSCHs occupied by the control channel indication sequences may be configured to be fixed values.

Hereinafter, the time domain positions and the frequency domain positions of the control channel indication sequences and the corresponding PSCCHs are described in detail respectively.

In some embodiments, the control channel indication sequences may be detected on a pre-set symbol in each time slot. In other words, the multiple control channel indicator sequences in each time slot may be located on a same symbol in the time slot, that is, the multiple control channel indicator sequences have a same time domain position.

In some embodiments, the control channel indication sequences in each time slot may be configured on any symbol in the time slot. The PSCCHs corresponding to the control channel indication sequences may also be configured on any symbol of the time slot, but need to be configured within a frequency domain range where the control channel indication sequences is located, where the frequency domain range in which the control channel indication sequences is located, is a union of each frequency domain range corresponding to each control channel indication sequence.

In an embodiment, a first symbol of the time slot may be used as the time domain position of the control channel indication sequences. Since the first symbol of each time slot also works as an Automatic Gain Control (AGC), taking the first symbol of each time slot as the time domain position of the control channel indication sequences can save transmission resources and improve resource utilization. In this case, the PSCCHs corresponding to the control channel indication sequences may be located on any symbol in the same time slot.

In another embodiment, a previous symbol of the corresponding PSCCHs in the time slot may be used as the time domain position of the control channel indication sequences. Since the PSCCHs have a one-to-one corresponding relationship with the control channel indication sequences and the previous symbol of the PSCCHs also performs channel estimation, taking the previous symbol of the corresponding PSCCHs in the time slot as the time domain position of the control channel indication sequences can save transmission resources and improve resource utilization. In this case, the PSCCHs corresponding to the control channel indication sequences are located on an adjacent symbol and within the frequency domain range where the control channel indication sequences are located.

In an embodiment, the time domain position of the control channel indication sequences may be a first symbol of the time slot which is also a previous symbol of the corresponding PSCCHs. That is, the time domain position of the control channel indication sequences may be set on the first symbol of the time slot, and a start symbol of the corresponding PSCCHs may be set on a second symbol of the time slot.

In some embodiments, in order to deal with a possible frequency domain length of all PSSCHs and the detection difficulty, a frequency domain length of the control channel indication sequences may be configured to be less than or equal to a minimum length of a minimum frequency domain unit that may be configured for PSSCHs associated with the PSCCHs.

In some embodiments, taking a sub-channel as the minimum frequency domain unit of the PSSCHs as an example, one sub-channel occupies multiple consecutive Resource Blocks (RBs). In order to deal with a possible frequency domain length of all PSSCHs and the detection difficulty, a frequency domain length of the control channel indication sequences may be configured to be less than or equal to a minimum length of a minimum frequency domain unit that may be configured for PSSCHs associated with the PSCCHs.

Figure 3:
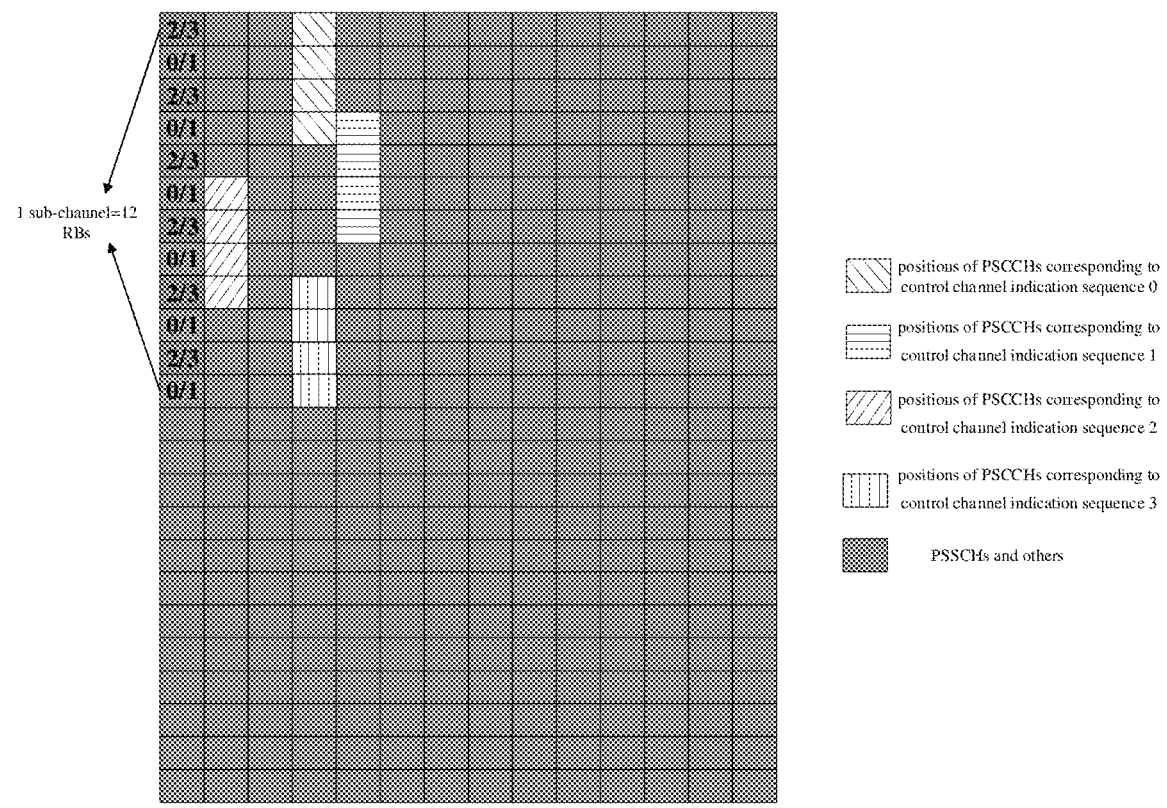
FIG. 3 is a schematic diagram of positions of control channel indication sequences and PSCCHs according to an embodiment.
Figure 4:
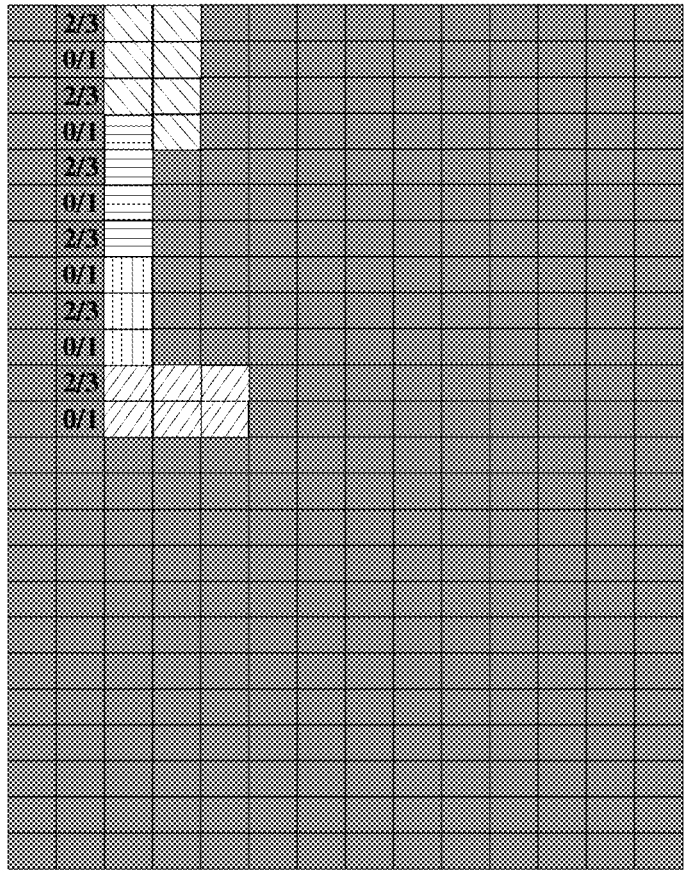
FIG. 4 is a schematic diagram of positions of control channel indication sequences and PSCCHs according to another embodiment.

As shown in FIG. 3 and FIG. 4, one sub-channel occupies 12 RBs, and the minimum length of sub-channels that may be configured for the PSSCHs is 1 sub-channel. Although the UE uses 2 sub-channels for transmission of the PSSCHs, the frequency domain length of the control channel indication sequences (that is, the frequency domain length occupied by the control channel indication sequences 0 to 3 in the figures) is still 1 sub-channel. It is understandable that, the frequency domain length of the control channel indication sequences may be less than 1 sub-channel.

In an embodiment, if the frequency domain length of the control channel indication sequences is configured to be p minimum frequency domain units, where p is a positive integer, a frequency domain position where the control channel indication sequences is located may be configured at a first p minimum frequency domain units or a last p minimum frequency domain units of the PSSCHs associated with the PSCCHs.

In another embodiment, a start position of the frequency domain resources where the control channel indication sequences are located may be configured in a middle minimum frequency domain unit of the PSSCHs associated with the PSCCHs. When a minimum number of frequency domain units of the PSSCHs associated with the PSCCHs is an odd number, the starting position of the frequency domain resources where the control channel indication sequences are located may be determined by rounding up or rounding down.

For example, in an embodiment, taking a sub-channel as a minimum frequency domain unit of the PSSCHs as an example, if the PSSCHs may be configured with at least 1 sub-channel and the PSSCHs have 5 sub-channels, the starting position of the frequency domain resources where the control channel indication sequences are located may be set on a third sub-channel (by rounding up) or a second sub-channel (by rounding down) of the PSSCHs.

Specifically, different control channel indication sequences may be located at different frequency domain positions, or may also be located at a same frequency domain position.

As shown in FIG. 3, control channel indication sequences 0 and 1 are located on same resource blocks, and control channel indication sequences 2 and 3 are located on same resource blocks. However, the control channel indication sequences 0 and 1, and the control channel indication sequences 2 and 3, are located on different resource blocks.

In order to reduce the complexity of detecting the control channel indication sequences, the sending UE may distinguish control channel indication sequences located on different resource blocks by means of Frequency Comb. As for multiple control channel indication sequences located on a same resource block, the sending UE may enable the multiple control channel indication sequences located on the same resource block to multiplex the same resource block by means of Cyclic shift or Orthogonal Cover Code.

Correspondingly, for the receiving UE, the control channel indication sequences transmitted on the different resource blocks may be determined based on a pre-set Frequency Comb parameter at a pre-set position of each time slot, and the control channel indication sequences transmitted on the same resource block may be determined based on a pre-set Cyclic shift parameter Or a pre-set Orthogonal Cover Code parameter.

IN S22, according to the control channel indication sequences, the time-frequency resource positions of the corresponding PSCCHs in the time slot are determined.

In some embodiments, the PSCCHs corresponding to the control channel indication sequences may be located on any symbol of the time slot. When the pre-set symbol is a previous symbol of the corresponding PSCCHs, the PSCCHs corresponding to the control channel indication sequences may be located on any symbol of the time slot and within a frequency range where the control channel indication sequences are located.

For example, as shown in FIG. 3, control channel indication sequences 0 to 3 are located on a first symbol of a time slot, and PSCCHs corresponding to the control channel indication sequences 0 to 3 respectively are located on other symbols of the time slot and within a frequency range where the control channel indication sequences 0 to 3 are located.

For another example, as shown in FIG. 4, control channel indication sequences 0 to 3 are located on a second symbol of a time slot, and start positions of four PSCCHs corresponding to the control channel indication sequences 0 to 3 are located on a third symbol and within a frequency range where the control channel indication sequences 0 to 3 are located.

In some embodiments, a start position of the PSCCHs corresponding to the control channel indication sequences may be configured in a middle minimum frequency domain unit of the PSSCHs associated with the PSCCHs. When a minimum number of frequency domain units of the PSSCHs associated with the PSCCHs is an odd number, the starting position of the PSCCHs corresponding to the control channel indication sequences may be determined by rounding up or rounding down.

In some embodiments, the control channel indication sequences may correspond to a specific time-frequency position of the PSCCHs, or may correspond to a time-frequency resource range of the PSCCHs (as shown in FIG. 3). When the control channel indication sequences corresponds to the time-frequency resource range of the PSCCHs, the time-frequency resource range of the corresponding PSCCHs in the time slot may be determined according to the detected control channel indication sequences; and then within the determined time-frequency resource range, blind detection may be performed according to pre-set detection parameters to determine the time-frequency resource position of the PSCCHs corresponding to the control channel indication sequences. Specifically, the pre-set detection parameters may be pre-configured parameters such as an aggregation level and a candidate position.

It is understandable that in a specific embodiment, time-frequency resource ranges of different PSCCHs may partially overlap. For example, referring to FIG. 3, time-frequency resource ranges of PSCCHs corresponding to control channel indication sequence 0 and control channel indication sequence 1 may overlap at a fourth resource block of the sub-channel, and the time-frequency resource ranges of the PSCCHs corresponding to the control channel indication sequence 0 and the control channel indication sequence 1 may overlap at an eleventh resource block of the sub-channel.

It is understandable that in a specific embodiment, a resource pool corresponding to the PSSCHs may change. When the time-frequency resource positions of the corresponding PSCCHs are indicated by the control channel indication sequences, configuration of the control channel indication sequences may be changed with the change of the resource pool corresponding to the PSSCHs, which facilitates flexible configuration.

In summary, according to the embodiments, multiple sets of control channel indication sequences are used to indicate the positions of all PSCCHs of the UE, so that the UE can configure the PSCCHs more flexibly and support multiple sets of PSCCHs with different functions.

Figure 5:
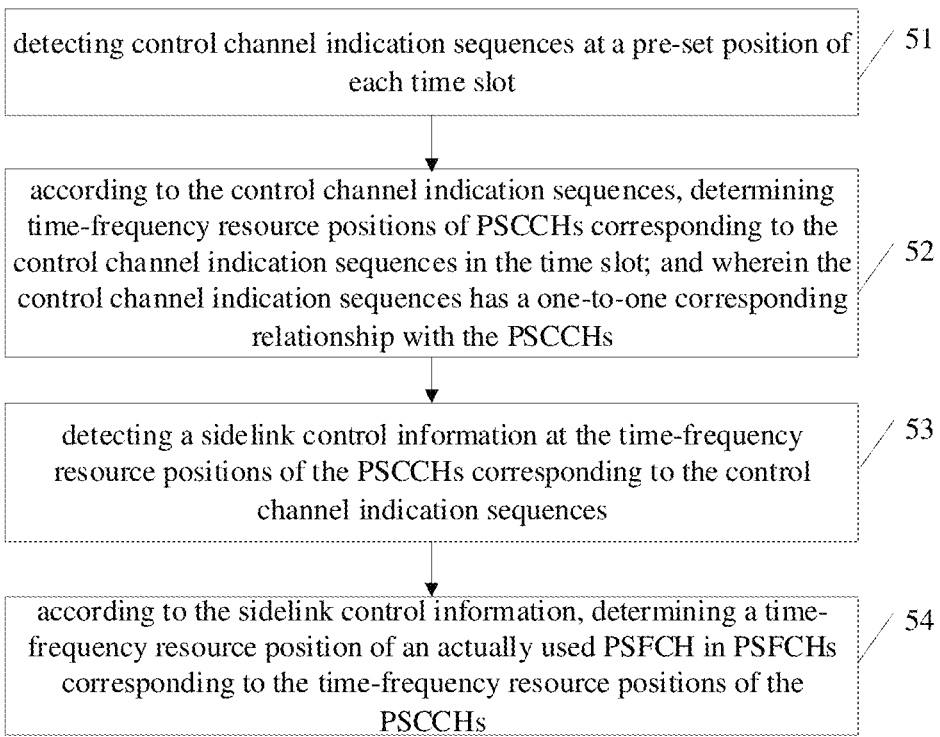
FIG. 5 schematically illustrates a flow chart of an information transmission method for a sidelink according to another embodiment.

FIG. 5 schematically illustrates a flow chart of an information transmission method for a sidelink according to another embodiment. Referring to FIG. 5, the method includes S51 to S54.

In S51, control channel indication sequences are detected at a pre-set position of each time slot.

In S52, according to the control channel indication sequences, time-frequency resource positions of corresponding PSCCHs are determined in the time slot; where the control channel indication sequences has a one-to-one corresponding relationship with the PSCCHs.

Principles, detailed implementation and advantages of S51 and S52 can be found in the above descriptions of S21 and S22, and are not described here.

In S53, a sidelink control information is detected at the time-frequency resource positions where the PSCCHs corresponding to the control channel indication sequences are located.

In some embodiments, after determining the time-frequency resource positions of the PSCCHs in each time slot, the sidelink control information may be blindly detected at the time-frequency resource positions.

In S54, according to the sidelink control information, an actual used time-frequency resource position is determined in Physical Sidelink Feedback Channels (PSFCHs) corresponding to the time-frequency resource positions of the PSCCHs.

In some embodiments, in each time slot, multiple available PSFCHs are pre-configured by a higher layer for each PSCCH indicated by the control channel indication sequences. In each time slot, different time-frequency resource positions of the PSCCH correspond to different time-frequency resource positions of the multiple available PSFCHs. The sending UE may indicate an actually used time-frequency resource position of the PSFCHs through the sidelink control information. The actually used PSFCH is one of the multiple available PSFCHs corresponding to the PSCCH.

In one embodiment, the multiple available PSFCHs corresponding to the time-frequency resource positions of the PSCCH may use independent time-frequency resource positions within a time-frequency resource range of the PSSCHs corresponding to the PSCCH, that is, time-frequency resource of the multiple available PSFCHs may be independent from that of the PSSCHs. In another embodiment, the multiple available PSFCHs corresponding to the time-frequency resource positions of the PSCCH may share time-frequency resource positions with the PSSCHs within a time-frequency resource range of the PSSCHs corresponding to the PSCCH, that is, the multiple available PSFCHs may share time-frequency resource with the PSSCHs.

Figure 6:
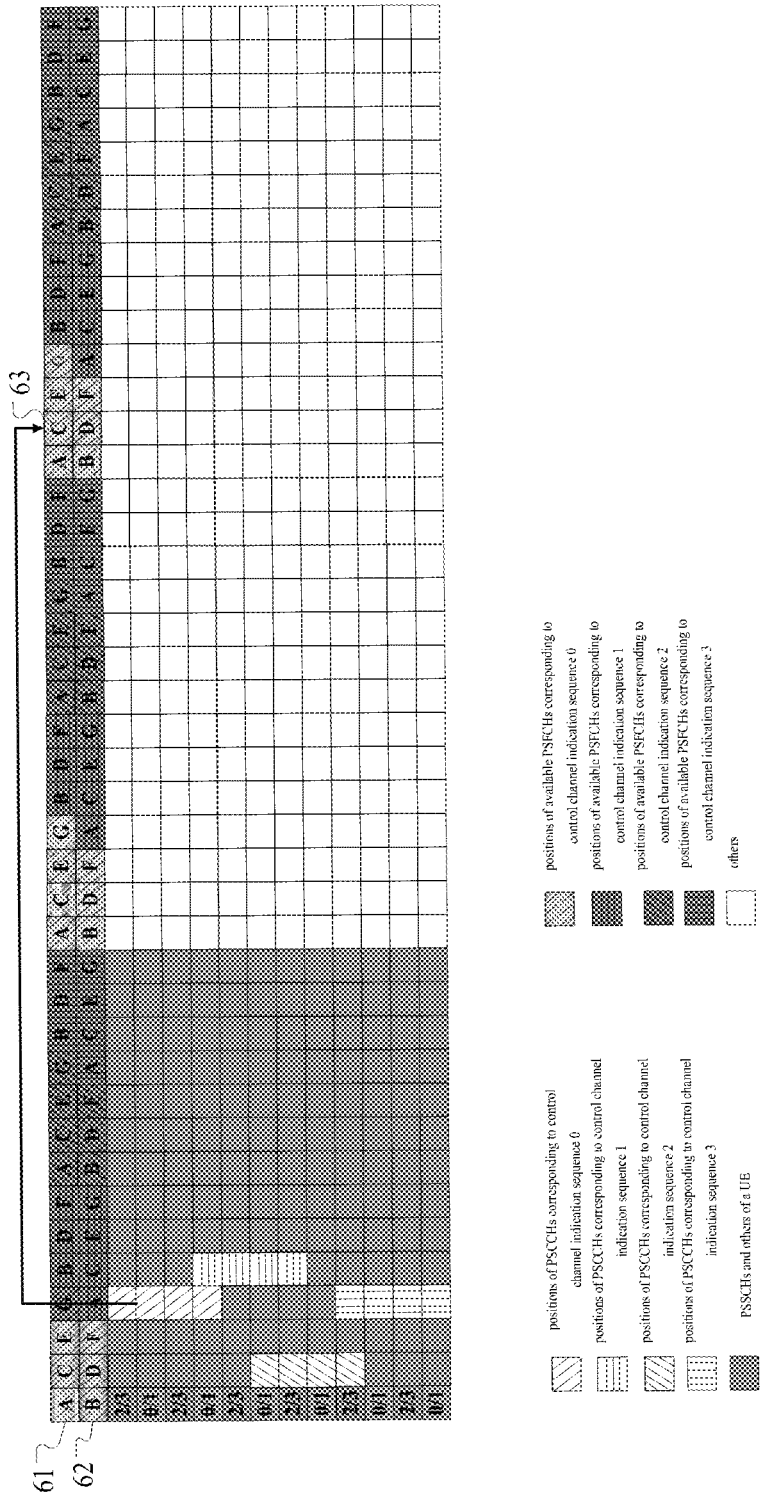
FIG. 6 is a schematic diagram of positions of control channel indication sequences, PSCCHs and sidelink feedback channels according to an embodiment.

Referring to FIG. 6, time-frequency resources of PSFCHs corresponding to time-frequency resource positions of a PSCCH are resource block 61 and resource block 62, which are independent from time-frequency resources of PSSCHs. In this case, the time-frequency resources of the PSFCHs are repeated on same resource blocks in each time slot.

Figure 7:
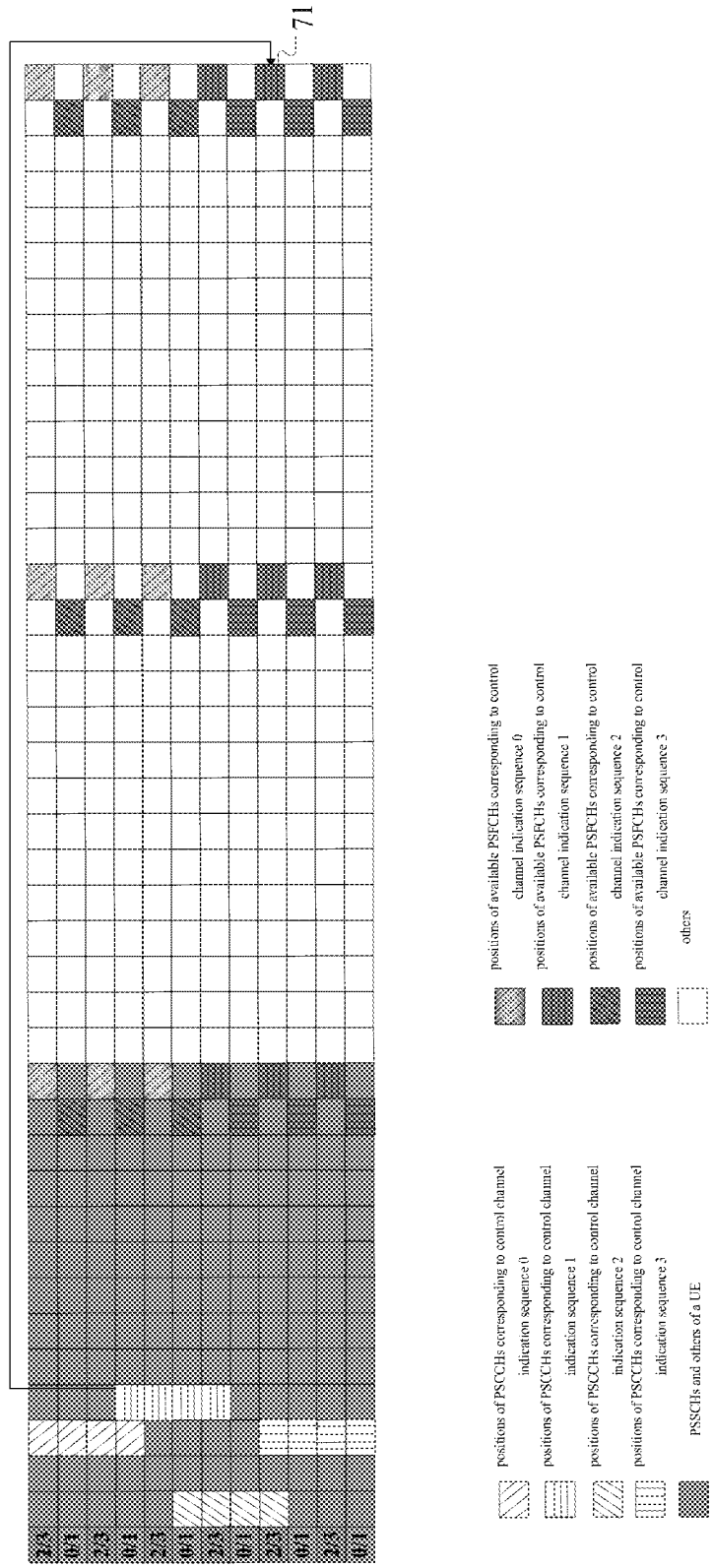
FIG. 7 is a schematic diagram of positions of control channel indication sequences, PSCCHs and sidelink feedback channels according to another embodiment.

Referring to FIG. 7, PSFCHs share time-frequency resources with PSSCHs. Assuming that the PSSCHs is configured with at least q sub-channels, on every p sub-channels, multiple available PSFCHs are pre-configured for a PSCCH in a corresponding resource pool. Positions of the multiple available PSFCHs are repeated on every q sub-channels.

In some embodiments, according to the detected sidelink control information, the time-frequency resource positions of the actually used PSFCH may be determined in multiple ways, which is not limited here.

In an embodiment, the time-frequency resource position of the actually used PSFCH may be determined according to a time-domain offset information in the sidelink control information and an identification information of the actually used PSFCH. Specifically, the PSFCHs corresponding to the time-frequency resource positions of the PSCCH may use independent time-frequency resource positions within the time-frequency resource range of the PSSCHs corresponding to the PSCCH.

For example, referring to FIG. 6, assuming that a sending UE uses a control channel indication sequence 0 to indicate a PSCCH, at a time-frequency resource position of the PSCCH, an upper layer pre-configures 7 available PSFCHs in each time slot, which are PSFCHs A-G. In this case, a sidelink control information includes: a time domain offset information and an identification information of an actually used PSFCH, where the time domain offset information may be 2 slots, and the identification information of the actually used PSFCH is 010, then the time-frequency resource position of the actually used PSFCH is resource block 63.

In an embodiment, the time-frequency resource position of the actually used PSFCH may be determined according to a frequency domain offset information, a time domain offset information, and an identification information of the actually used PSFCH. Specifically, the PSFCHs corresponding to the time-frequency resource positions of the PSCCH may share time-frequency resource positions within the time-frequency resource range of the PSSCHs corresponding to the PSCCH.

For example, referring to FIG. 7, assuming that a sending UE uses a control channel indication sequence 1 to indicate a PSCCH, at a time-frequency resource position of the PSCCH, an upper layer pre-configures 3 available PSFCHs in each time slot. In this case, a sidelink control information includes: a frequency domain offset information, a time domain offset information, and an identification information of the actually used PSFCH. Specifically, the frequency domain offset information is 0, the time domain offset information is 2 slots, and the identification information of the actually used PSFCH is 01 (which indicates a second PSFCH), then the time-frequency resource position of the actually used PSFCH is resource block 71.

In some embodiments, a receiving UE may need to simultaneously transmit a Sidelink Feedback Control Information (SFCI) and some data to a sending UE through a PSFCH. In this case, in order to improve information transmission efficiency, the receiving UE may choose to transmit the SFCI through the PSFCH or transmit the data through the PSCCH according to transmission priorities pre-configured by the higher layer.

In an embodiment, the transmission priorities may be configured based on at least one of the following factors: a number of carriers simultaneously transmitted by the sending UE and the receiving UE; a related configuration of a carrier combination of the sending UE and the receiving UE; and a callback time of radio frequency receiving and sending of the sending UE and the receiving UE. Specifically, the related configuration of the carrier combination may include: supporting the carrier combination or not, and a number of carrier combination that can be supported when the carrier combination is supported.

In conclusion, an actually used PSFCH is determined according to time-frequency resource positions of a PSCCH. Since the actually used PSFCH is one of the PSFCHs corresponding to the time-frequency resource positions of the PSCCH, so when the sidelink control information is used to indicate the actually used PSFCH, even if some UEs miss the sidelink control information, a same PSFCH will not be used between different UEs, that is, PSFCH collisions can be avoided, which facilitates reducing mutual interference between the UEs. Furthermore, instead of using the sidelink control information to indicate the actually used PSFCH in all PSFCHs, the actually used PSFCH is indicated in the multiple PSFCHs corresponding to the PSCCH, which facilitates reducing a number of bits required for the UE to send the sidelink control information and saving transmission resources.

In order to clarify the object, characteristic and advantages of embodiments of the present disclosure, a device and a computer-readable storage medium corresponding to the methods described above will be described in detail below.

Figure 8:
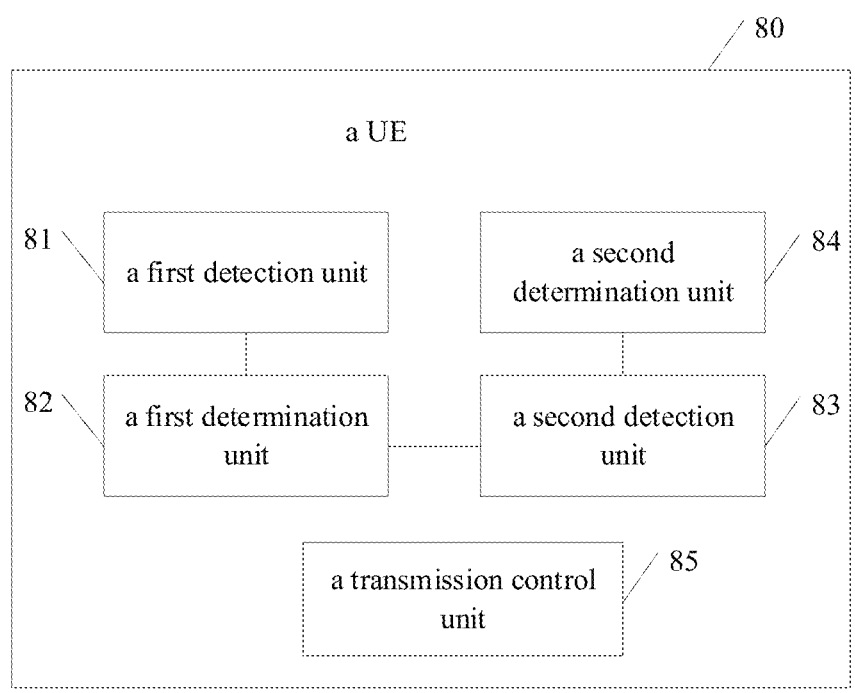
FIG. 8 is a structural diagram of a UE according to an embodiment.

FIG. 8 is a structural diagram of a UE 80 according to an embodiment. Referring to FIG. 8, the UE 80 includes: a first detection unit 81 and a first determination unit 82.

In some embodiments, the first detection unit 81 is adapted to detect control channel indication sequences at a pre-set position of each time slot.

In some embodiments, the first determination unit 82 is adapted to, according to the control channel indication sequences, determine time-frequency resource positions of corresponding PSCCHs in the time slot; wherein the control channel indication sequences has a one-to-one corresponding relationship with the PSCCHs.

In an embodiment, the first detection unit 81 is adapted to detect the control channel indication sequences on a pre-set symbol in each time slot. In other words, multiple control channel indication sequences are located on the same symbol of the time slot.

In an embodiment, the pre-set symbol may be a first symbol of the time slot, or a previous symbol of the corresponding PSCCHs in the time slot, or a first symbol in the time slot which is a previous symbol of the corresponding PSCCHs.

In an embodiment, a frequency domain length of the control channel indication sequences detected by the first detection unit 81 is less than or equal to a minimum length of a minimum frequency domain unit configured for PSSCHs associated with the PSCCHs.

In an embodiment, when the frequency domain length of the control channel indication sequences detected by the first detection unit 81 is p minimum frequency domain units, where p is a positive integer; and the frequency domain resource positions where the control channel indication sequences are located are first p minimum frequency domain units or last p minimum frequency domain units of the PSSCHs associated with the PSCCHs.

In another embodiment, a start position of the frequency domain resources where the control channel indication sequences detected by the first detection unit 81 are located, may be configured in a middle minimum frequency domain unit of the PSSCHs associated with the PSCCHs.

In other embodiments, the start position of the frequency domain resources where the control channel indication sequences detected by the first detection unit 81 are located, may be configured in other frequency domain positions of the PSSCHs associated with the PSCCHs, which are not described in detail here.

In an embodiment, the first detection unit 81 is adapted to, at the pre-set position of each time slot, determine the control channel indication sequences transmitted on different resource blocks according to a pre-set frequency comb parameter and determine the control channel indication sequences multiplexed on a same resource block according to a pre-set cyclic shift parameter or a pre-set orthogonal cover code parameter. Specifically, the frequency comb parameter, the cyclic shift parameter, and the orthogonal cover code parameter correspond to corresponding parameters used by the sending UE.

In some embodiments, when the pre-set symbol is a previous symbol of the corresponding PSCCHs, the corresponding PSCCHs of the control channel indication sequences detected by the first detection unit 81 may be located on any symbol of the time slot and be within a frequency domain range of the control channel indication sequences.

In some embodiments, the first determination unit 82 may directly determine the time-frequency resource positions of the corresponding PSCCHs in the time slot according to the detected control channel indication sequences; or may first determine a time-frequency resource range of the corresponding PSCCHs in the time slot according to the detected control channel indication sequences, and then determine the time-frequency resource positions of the corresponding PSCCHs in the time slot by performing blind detection within the time-frequency resource range according to a pre-set detection parameter.

In summary, according to the embodiments of the present disclosure, the control channel indication sequences are detected, and then the corresponding PSCCHs are determined according to the control channel indication sequences, which not only enables a UE at a receiving end to detect the positions of the PSCCHs, but also enables a UE at a sending end to configure the PSCCHs flexibly and to support multiple PSCCHs with different functions.

In some embodiments, the UE 80 may further include: a second detection unit 83 and a second determination unit 84.

In some embodiments, the second detection unit 83 is adapted to detect a sidelink control information at the time-frequency resource positions of the PSCCHs corresponding to the control channel indication sequences.

In some embodiments, the second determination unit 84 is adapted to determine a time-frequency resource position of an actually used PSFCH in PSFCHs corresponding to the time-frequency resource positions of the PSCCHs.

In an embodiment, the second determination unit 84 is adapted to, according to a time-domain offset information in the sidelink control information and an identification information of the actually used PSFCH, determine the time-frequency resource position of the actually used PSFCH among the PSFCHs corresponding to the time-frequency resource positions of the PSCCHs.

Specifically, the PSFCHs corresponding to the time-frequency resource positions of the PSCCHs may use independent time-frequency resource positions within the time-frequency resource range of the PSSCHs corresponding to the PSCCHs.

In another embodiment, the second determination unit 84 is adapted to, according to a frequency domain offset information, a time domain offset information and an identification information of the actually used PSFCH, determine the time-frequency resource position of the actually used PSFCH among the PSFCHs corresponding to the time-frequency resource positions of the PSCCHs.

Specifically, the PSFCHs corresponding to the time-frequency resource positions of the PSCCHs may share time-frequency resource positions within the time-frequency resource range of the PSSCHs corresponding to the PSCCHs.

In some embodiments, the UE 80 may further include: a transmission control unit 85. The transmission control unit 85 is adapted to, when a Sidelink Feedback Control Information (SFCI) and a transmission data need to be sent at the same time, determine an order of sending the SFCI and the transmission data according to pre-configured transmission priorities.

In an embodiment, the transmission priorities may be configured based on at least one of the following factors:
  a number of carriers simultaneously transmitted by the sending UE and the receiving UE;
  a related configuration of a carrier combination of the sending UE and the receiving UE; and
  a callback time of radio frequency receiving and sending of the sending UE and the receiving UE.

In conclusion, according to the embodiments of the present disclosure, the second detection unit can detect the sidelink control information at the time-frequency resource positions of the PSCCHs corresponding to the control channel indication sequences, and the second determination unit 84 can determine the time-frequency resource position of the actually used PSFCH in the PSFCHs corresponding to the time-frequency resource positions of the PSCCHs according to the sidelink control information. Since the actually used PSFCH is one of the PSFCHs corresponding to the time-frequency resource positions of the PSCCHs, so when the sidelink control information is used to indicate the actually used PSFCH, even if some UEs miss the sidelink control information, a same PSFCH will not be used between different UEs, that is, PSFCH collisions can be avoided, which facilitates reducing mutual interference between the UEs. Furthermore, instead of using the sidelink control information to indicate the actually used PSFCH in all PSFCHs, the actually used PSFCH is indicated in the multiple PSFCHs corresponding to the PSCCHs, which facilitates reducing a number of bits required for the UE to send the sidelink control information and saving transmission resources.

In an embodiment of the present disclosure, a computer-readable storage medium having computer instructions stored therein is provided, wherein once the computer instructions are executed, the above information transmission method for a sidelink is performed.

The storage medium may include a Read Only Memory (ROM), a Random Access Memory (RAM), a magnetic disk, an optical disk or the like.

In an embodiment of the present disclosure, a user equipment including a memory and a processor is provided, wherein the memory has computer instructions stored therein, and when the processor executes the computer instructions, the above information transmission method for a sidelink is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An information transmission method for a sidelink, comprising:
   detecting control channel indication sequences at a pre-set position of each time slot; and
   according to the control channel indication sequences, determining time-frequency resource positions of Physical Sidelink Control Channels (PSCCHs) corresponding to the control channel indication sequences in the time slot, wherein the control channel indication sequences have a one-to-one corresponding relationship with the PSCCHs;
   wherein a frequency domain length of the control channel indication sequences is less than or equal to a minimum length of a minimum frequency domain unit configured for Physical Sidelink Shared Channels (PSSCHs) associated with the PSCCHs.

2. The information transmission method for a sidelink according to claim 1, wherein detecting control channel indication sequences at a pre-set position of each time slot comprises:
   detecting the control channel indication sequences on a pre-set symbol of each time slot.

3. The information transmission method for a sidelink according to claim 2, wherein the pre-set symbol comprises one of:
   a first symbol of the time slot;
   a previous symbol of the PSCCHs in the time slot; and
   a first symbol of the time slot which is a previous symbol of the PSCCHs.

4. The information transmission method for a sidelink according to claim 1, wherein the frequency domain length of the control channel indication sequences is p minimum frequency domain units, where p is a positive integer;
   and frequency domain resource positions where the control channel indication sequences are located, are first p minimum frequency domain units or last p minimum frequency domain units of the PSSCHs associated with the PSCCHs.

5. The information transmission method for a sidelink according to claim 1, wherein a start position of the frequency domain resources where the control channel indication sequences are located is in a middle minimum frequency domain unit of the PSSCHs associated with the PSCCHs.

6. The information transmission method for a sidelink according to claim 2, wherein detecting the control channel indication sequences on a pre-set symbol of each time slot comprises:
   at the pre-set position of each time slot, determining the control channel indication sequences transmitted on different resource blocks according to a pre-set frequency comb parameter; and
   determining the control channel indication sequences multiplexed on a same resource block according to a pre-set cyclic shift parameter or a pre-set orthogonal cover code parameter.

7. The information transmission method for a sidelink according to claim 2, wherein when the pre-set symbol is a previous symbol of the PSCCHs, the PSCCHs corresponding to the control channel indication sequences are located on any symbol of the time slot and within a frequency domain range of the control channel indication sequences.

8. The information transmission method for a sidelink according to claim 1, wherein according to the control channel indication sequences, determining time-frequency resource positions of PSCCHs corresponding to the control channel indication sequences in the time slot comprises:
   according to the control channel indication sequences, determining a time-frequency resource range of the PSCCHs in the time slot; and
   within the time-frequency resource range, performing blind detection according to a pre-set detection parameter to determine the time-frequency resource positions of the PSCCHs corresponding to the control channel indication sequences in the time slot.

9. The information transmission method for a sidelink according to claim 1, further comprising:
   detecting a sidelink control information at the time-frequency resource positions of the PSCCHs corresponding to the control channel indication sequences; and
   according to the sidelink control information, determining a time-frequency resource position of an actually used Physical Sidelink Feedback Channel (PSFCH) in PSFCHs corresponding to the time-frequency resource positions of the PSCCHs.

10. The information transmission method for a sidelink according to claim 9, wherein according to the sidelink control information, determining a time-frequency resource position of an actually used Physical Sidelink Feedback Channel (PSFCH) among PSFCHs corresponding to the time-frequency resource positions of the PSCCHs comprises:
    according to a time-domain offset information in the sidelink control information and an identification information of the actually used PSFCH, determining the time-frequency resource position of the actually used PSFCH among the PSFCHs corresponding to the time-frequency resource positions of the PSCCHs; and
    the PSFCHs corresponding to the time-frequency resource positions of the PSCCHs use independent time-frequency resource positions within the time-frequency resource range of the PSSCHs associated with the PSCCHs.

11. The information transmission method for a sidelink according to claim 9, wherein according to the sidelink control information, determining a time-frequency resource position of an actually used Physical Sidelink Feedback Channel (PSFCH) among PSFCHs corresponding to the time-frequency resource positions of the PSCCHs comprises:
    according to a frequency domain offset information, a time domain offset information and an identification information of the actually used PSFCH, determining the time-frequency resource position of the actually used PSFCH among the PSFCHs corresponding to the time-frequency resource positions of the PSCCHs; and
    wherein the PSFCHs corresponding to the time-frequency resource positions of the PSCCHs share time-frequency resource positions within the time-frequency resource range of the PSSCHs associated with the PSCCHs.

12. The information transmission method for a sidelink according to claim 9, further comprising:
    when a Sidelink Feedback Control Information (SFCI) and a transmission data need to be sent at the same time, determining an order of sending the SFCI and the transmission data according to pre-configured transmission priorities.

13. The information transmission method for a sidelink according to claim 12, wherein the transmission priorities are configured based on at least one of following factors:

a number of carriers which are able to be simultaneously transmitted by a sending User Equipment (UE) and a receiving UE;

a related configuration of a carrier combination of the sending UE and the receiving UE; and a callback time of radio frequency receiving and sending of the sending UE and the receiving UE.

14. A User Equipment (UE), comprising:

a first detection circuitry, adapted to detect control channel indication sequences at a pre-set position of each time slot; and a first determination circuitry, adapted to, according to the control channel indication sequences, determine time-frequency resource positions of PSCCHs corresponding to the control channel indication sequences in the time slot, wherein the control channel indication sequences have a one-to-one corresponding relationship with the PSCCHs;

wherein a frequency domain length of the control channel indication sequences is less than or equal to a minimum length of a minimum frequency domain unit configured for Physical Sidelink Shared Channels (PSSCHs) associated with the PSCCHs.

15. The UE according to claim 14, further comprising:

a second detection circuitry, adapted to detect a sidelink control information at the time-frequency resource positions of the PSCCHs corresponding to the control channel indication sequences; and a second determination circuitry, adapted to, according to the sidelink control information, determine a time-frequency resource position of an actually used Physical Sidelink Feedback Channel (PSFCH) in PSFCHs corresponding to the time-frequency resource positions of the PSCCHs.

16. The UE according to claim 14, further comprising:

a transmission control circuitry, adapted to, when a Sidelink Feedback Control Information (SFCI) and a transmission data need to be sent at the same time, determine an order of sending the SFCI and the transmission data according to pre-configured transmission priorities.

17. The UE according to claim 16, wherein the transmission priorities are configured based on at least one of following factors:

a number of carriers which are able to be simultaneously transmitted by a sending User Equipment (UE) and a receiving UE;

a related configuration of a carrier combination of the sending UE and the receiving UE; and a callback time of radio frequency receiving and sending of the sending UE and the receiving UE.

18. A non-transitory storage medium having computer instructions stored therein, wherein once the computer instructions are executed, the method according to claim 1 is performed.

19. A user equipment comprising a memory and a processor is provided, wherein the memory stores one or more programs, the one or more programs comprising computer instructions, when executed by the processor, cause the processor to:

detect control channel indication sequences at a pre-set position of each time slot; and according to the control channel indication sequences, determine time-frequency resource positions of Physical Sidelink Control Channels (PSCCHs) corresponding to the control channel indication sequences in the time slot, wherein the control channel indication sequences have a one-to-one corresponding relationship with the PSCCHs, wherein a frequency domain length of the control channel indication sequences is less than or equal to a minimum length of a minimum frequency domain unit configured for Physical Sidelink Shared Channels (PSSCHs) associated with the PSCCHs.

* * * * *